United States Patent
Kolaczkowski et al.

(10) Patent No.: US 9,505,617 B2
(45) Date of Patent: Nov. 29, 2016

(54) RADIATING WALL CATALYTIC REACTOR AND PROCESS FOR CARRYING OUT A CHEMICAL REACTION IN THIS REACTOR

(71) Applicant: Alantum Europe GmbH, Oberhaching (DE)

(72) Inventors: Stanislaw Tadeusz Kolaczkowski, Bath and North East Somerset (GB); Dirk Naumann, Quebec (CA); Shadi Saberi, Oakville (CA); Babak Saberi, Oakville (CA)

(73) Assignee: Alantum Europe GmbH, Oberhaching (DE)

( * ) Notice: Subject to any disclaimer, the term of this patent is extended or adjusted under 35 U.S.C. 154(b) by 0 days.

(21) Appl. No.: 14/772,619

(22) PCT Filed: Mar. 4, 2014

(86) PCT No.: PCT/EP2014/054111
§ 371 (c)(1),
(2) Date: Sep. 3, 2015

(87) PCT Pub. No.: WO2014/135510
PCT Pub. Date: Sep. 12, 2014

(65) Prior Publication Data
US 2016/0002036 A1    Jan. 7, 2016

(30) Foreign Application Priority Data
Mar. 4, 2013    (EP) ..................... 13157642

(51) Int. Cl.
*B01J 8/04*      (2006.01)
*C01B 3/38*      (2006.01)
(Continued)

(52) U.S. Cl.
CPC ............. *C01B 3/384* (2013.01); *B01J 8/008* (2013.01); *B01J 8/048* (2013.01); *B01J 8/0453* (2013.01);
(Continued)

(58) Field of Classification Search
CPC .............. C01B 2203/1023; C01B 2203/0233; C01B 2203/1011; C01B 3/38; C01B 2203/068; C01B 3/025; B01J 8/0453; B01J 19/2485; B01J 2219/0077; B01J 8/062; B01J 2208/00849; B01J 19/006; B01J 19/2415; B01J 8/008
See application file for complete search history.

(56) References Cited

U.S. PATENT DOCUMENTS 3,617,227 A    11/1971  Beggs
4,042,334 A     8/1977  Matovich
(Continued)

FOREIGN PATENT DOCUMENTS

CN    101970095 A    2/2011
SE    WO 2009109379 A1 *  9/2009    .............. B01J 8/008
(Continued)

OTHER PUBLICATIONS

International Searching Authority, International Search Report of PCT/EP2014/054111 dated May 9, 2014 [PCT/ISA/210].
(Continued)

*Primary Examiner* — Stanley Silverman
*Assistant Examiner* — Syed Iqbal
(74) *Attorney, Agent, or Firm* — Sughrue Mion, PLLC (57) ABSTRACT

Disclosed are a radiating wall catalytic reactor for providing heat from the inside wall surface 8 of a reaction chamber 1 by radiation 16 to support an overall endothermic gas phase chemical reaction taking place in the reaction chamber 1, and a process for carrying out a chemical reaction in the reactor. The reaction chamber 1 is provided with an entrance port 2 for introducing a gaseous reactant(s) in a continuous manner into the chamber 1 and an exit port 3 to enable the gaseous product(s) to leave the chamber 1 in a continuous manner. The reaction chamber 1 includes a plurality of catalyst segments (A)5, which has one void segment (B)6 on either side of it; and the reaction chamber 1 is made of a material(s) that is (are) suitable to resist a temperature of 700° C. or more.

12 Claims, 3 Drawing Sheets

(51) Int. Cl.
    *B01J 8/06*   (2006.01)
    *B01J 8/00*   (2006.01)
    *B01J 19/24*  (2006.01)

(52) U.S. Cl.
    CPC ............... *B01J 8/062* (2013.01); *B01J 19/24* (2013.01); *B01J 2208/00504* (2013.01); *B01J 2208/00522* (2013.01); *B01J 2208/00884* (2013.01); *B01J 2208/025* (2013.01); *B01J 2219/00024* (2013.01); *B01J 2219/00087* (2013.01); *B01J 2219/24* (2013.01); *C01B 2203/0233* (2013.01); *C01B 2203/0805* (2013.01); *C01B 2203/1241* (2013.01); *C01B 2203/143* (2013.01)

(56) References Cited

U.S. PATENT DOCUMENTS

| | | |
|---|---|---|
| 5,322,116 A | 6/1994 | Galloway et al. |
| 2011/0014109 A1 | 1/2011 | Norsk et al. |
| 2011/0194991 A1 | 8/2011 | Jin et al. |

FOREIGN PATENT DOCUMENTS

| | | |
|---|---|---|
| WO | 2008/040999 A2 | 4/2008 |
| WO | 2009/109379 A1 | 9/2009 |

OTHER PUBLICATIONS

Michiel Nijemeisland et al., "Catalyst design by CFD for heat transfer and reaction in steam reforming", Chemical Engineering Science, vol. 59, pp. 5185-5191, (2004).

David A. Lihou, "Heaters for Chemical Reactors: An industrial survey", I. Chem. E. Services for The Institution of Chemical Engineers, (68 pages total), Aug. 1975, ISBN 0852950055.

Zhongtao, Huang et al., "Commercial Catalyst Design and Development", Chemical Industry Press, Sep. 30, 2009, pp. 155-157, (total 5 pages).

State Intellectual Property Office of the People's Republic of China, Communication dated Jul. 5, 2016, issued in counterpart Chinese Application No. 201480025327.2.

\* cited by examiner

RADIATING WALL CATALYTIC REACTOR AND PROCESS FOR CARRYING OUT A CHEMICAL REACTION IN THIS REACTOR

CROSS REFERENCE TO RELATED APPLICATIONS

This application is a National Stage of International Application No. PCT/EP2014/054111, filed Mar. 4, 2014, claiming priority based on European Patent Application No. 13157642.3, filed Mar. 4, 2013, the contents of all of which are incorporated herein by reference in their entirety.

BACKGROUND OF THE INVENTION

The invention relates to a reactor with improved heat transfer and a process for carrying out an overall endothermic gas phase chemical reaction(s) in this reactor. The invention relates in particular to a radiating wall catalytic reactor for providing heat from the inside wall of a reaction chamber by radiation to support an endothermic reaction taking place in the reaction chamber, comprising a reaction chamber with an entrance port for the introduction of a gaseous reactant(s) in a continuous manner into the reaction chamber and an exit port to enable the gaseous product to leave the reaction chamber in a continuous manner. The invention relates also to a method for carrying out a chemical reaction in this reactor involving an improvement in heat transfer by radiation.

Chemical reactions carried out in such a reactor would usually involve the transfer of a large amount of heat through the wall of the reaction chamber (for example in Heaters for Chemical Reactors by D. Lihou, 1975, heat fluxes in the range of 15 to 100 kW/m$^2$ of tube surface area which contains the catalyst are reported). If the reaction is highly endothermic, then sufficient heating must be provided to sustain the desired reactions and this can be provided in a variety of ways. When the temperature of the reaction needs to be maintained high (e.g. above 700° C.), then the reaction chamber may be in the form of a tube (containing the catalytic material) which is mounted inside a fuel (gas or liquid fuel) fired furnace, which provides the necessary external source of heat from a hot zone (e.g. 1200 to 1500° C.) in the furnace maintained by burning a fuel. Heat from this flame and neighboring gaseous hot zone is transferred by a combination of radiation and convection to the outside surface of the tube (reaction chamber). There would normally be a plurality of tubes (reaction chambers) inside such a furnace. Within an individual tube which acts as a reactor, heat is usually transferred from the inside wall of the tube, to the flowing fluid and catalytic bed by a combination of: convection, conduction and radiation. In the hitherto known reactors, a variation of the temperature occurs over the cross-section of the tube (reaction chamber) which could be significant and then it has several drawbacks. Namely, the outside surface of the reaction chamber might need to be heated to very high temperatures to assure a sufficiently high temperature in the interior of the reaction chamber for desired endothermic chemical reactions. However, the life time of the reactor material strongly depends on the temperature and decreases sharply once a too high temperature is reached. On the other hand, at elevated temperatures near the wall, undesired chemical reactions might take place. For example, these could lead to the formation of carbon deposits, which would increase the resistance to heat transfer at a local position, which in turn could then lead to hot spots near the inner wall of the reaction chamber. Or, large temperature gradients from the wall to the centre of the tube (the reactor) can result in lower temperature regions in the centre of the tube (the reactor), which could lead to incomplete reactions near the centre, which in turn would require a longer length of reactor to achieve the necessary conversion.

Various attempts have been undertaken to overcome this situation and to alleviate the effects associated therewith.

U.S. Pat. No. 4,042,334 discloses a high temperature chemical reactor which comprises a tube which defines a reactor chamber, means for introducing an inert fluid into the reactor tube to provide a protective blanket for the inside surface of the tube; means for introducing reactants into the chamber, the reactants being confined centrally within the chamber by the protective blanket; and means for generating high intensity radiant energy which is directed in the chamber to coincide with at least a portion of the path of the reactants.

U.S. Pat. No. 5,322,116 describes a high temperature fluid-to-fluid heat exchanger for transferring heat from a higher temperature fluid flow region to a lower temperature fluid flow region, comprising inter alia wall means separating the high and lower temperature fluid flow regions and a porous ceramic foam material occupying a substantial portion of the lower temperature fluid flow region. The ceramic foam material is positioned proximate said wall means to absorb a substantial amount of radiated heat therefrom, wherein said ceramic foam does not contact said wall means, such that a narrow gap is formed between the wall means and the ceramic foam material having a porosity sufficient to permit a predetermined flow rate of fluid along the edge thereof.

Nijemeisland et al (2004), describe how computer fluid dynamic simulation could be used to model heat transfer performance in the near-wall regions of a steam methane reforming reactor, which is packed with catalyst pellets. This paper is interesting as one of the co-authors is from Johnson Matthey Catalysts (UK), a major company that manufactures and sells commercial catalysts for this type of application. In their paper (p. 5186), they state that "radiation was neglected in the simulations presented here, as it was shown in earlier work to be insignificant compared to convective heat transfer processes." This is an important statement, as it provides evidence that such methods of heat transfer are considered by such experts to be predominantly convective in nature.

M. Nijemeisland, A G Dixon, E. H. Stitt, (2004) Catalyst design by CFD for heat transfer and reaction in steam reforming, Chemical Engineering Science, 59 (2004) 5185-5191.

WO 2009/109379 A1 discloses a reactor, which is an endothermic catalytic reactor comprising one or more reactor tubes (or "ducts") which are formed by an inner and an outer tube/duct, which creates an annular region in the duct. The inner tube/duct comprises a catalyst, e.g. particles forming a catalyst fixed bed or catalyst coated or impregnated on structural elements arranged in the inner duct, whereby the structural element is for example a monolith. Disclosed are in particular monoliths coated with a noble-metal catalyst and a Ni-based catalyst. In between the catalysts, a flow detector is arranged, which forces the fluid passing through the outer duct (annular region) to flow inside the inner duct, which contains the catalyst. At the same time, the flow detector also forces the fluid passing through the inner duct to flow inside the outer duct. The reactor tube comprises for example several tube segments, e.g. fourteen tube segments, whereby each tube segment comprises a catalyst, an annulus and a flow deflector. One substream of the fluid thus passes the outer duct, i.e. the annular region, is forced by the flow detector into the inner duct with the catalyst and, after passing the catalyst, it is forced by the next flow detector into the outer duct again, whereas another substream of the fluid passes the same the inner duct, is forced by the flow detector into the outer duct and then by the next flow detector into the inner duct again. Thus, each substream of the fluid passes alternately the catalyst and the outer duct, thereby passing the catalyst of every second tube segment of the reactor tube. The substream running through the annular region is heated from an external source, while the substream running through the inner tube is cooled via endothermic reforming taken place on e.g. the catalytic structural elements. Thus, the substream, which passed the inner duct with the catalyst has been cooled therein and is then heated when passing the outer duct. The catalytic reactor may be used for steam reforming.

US 2011/0 194 991 A1 discloses a tubular reactor comprising an internal catalytic insert with a plurality of cup-shaped structures, whereby a supported catalyst is disposed or located within the central space of each of the plurality of the cup-shaped structures. In between two cup-shaped structures there may be a distance. The cup-shaped structures have orifices for forming fluid jets for impinging the fluid on the tube wall. This jet impingement is used to improve heat transfer between the fluid in the tube and the tube wall. Such a tubular reactor may be used for instance for endothermic reactions such as steam methane reforming.

WO 2008/040999 A2 discloses a reactor for carrying out a heterogeneously catalyzed reaction of at least one gaseous reactant and at least one liquid phase reactant. The reactor comprises at least first and second reaction zones, which are arranged in series and each comprising catalytic material. The catalytic material may be in particulate form or in the form of a unitary body defining pathways for the reactant gas/liquid mixture, whereby in a specially preferred embodiment the reaction zones each comprise a structured catalyst bed in the form of a monolith with parallel channels, e.g. a Pt catalyst distributed on a carbon support in the form of a monolith. Between the serially arranged reaction zones, heat transfer zones are located which may be of any suitable structure having regard to their function of helping to maintain the temperature of the contents of the reactor within desired limits. In general, the heat transfer zones define enclosed channels in which heat transfer fluid can flow in isolation from, but in heat-exchange relationship with, the process fluid of the reactor. Suitable heat transfer devices for use in the heat transfer zones include tubes or compact heat exchanger types of plates.

U.S. Pat. No. 3,617,227 discloses an apparatus for the catalytic reforming of gaseous hydrocarbon using steam and/or carbon dioxide as the reforming oxidant, e.g. steam methane reforming. The hydrocarbon and oxidant are passed through a tube, which is substantially uniformly heated over its entire length, e.g. to 1800-2200° F., and which contains refractory preheater particles adjacent the inlet opening and catalytic particles intermediate the preheater particles and the tube outlet. The catalyst is for example a 2-inch to 3-inch Alundum lump impregnated with nickel. If the catalyst tube is heated, the catalyst lump and the preheater lump are heated indirectly by radiation and conduction. By having the catalyst lump large, the individual particles are exposed directly to radiation emitted from the tube and are thereby able to benefit directly from the source of heat.

SUMMARY OF THE INVENTION

An underlying objective in this present invention is therefore to provide a reactor for chemical reactions which enables a better form of heat exchange to be achieved within the reaction chamber, by including a greater contribution from radiation from the inner wall of the reaction chamber while allowing at the same time to perform efficiently a desired chemical reaction. Preferably, a more uniform temperature distribution within the reaction chamber should be achievable.

This object is achieved by a radiating wall catalytic reactor and a process for carrying out a chemical reaction in a radiating wall catalytic reactor in accordance with the respective independent claims. Preferred embodiments of this reactor and process are indicated in the respective dependent claims. Preferred embodiments of the reactor correspond to preferred embodiments of the process and vice versa, even when this is not explicitly indicated.

Accordingly, the present invention is directed to a radiating wall catalytic reactor (in the following to be referred to also simply as "reactor") for providing heat from the inside wall surface of a reaction chamber by radiation to support an overall endothermic reaction taking place in the reaction chamber, comprising a reaction chamber with an entrance port for the introduction of a gaseous reactant(s) in a continuous manner into the reaction chamber and an exit port to enable the gaseous product(s) to leave the reaction chamber in a continuous manner;

wherein said reaction chamber comprises a plurality of catalyst segments (A) (to be referred to also as "catalytic bed segments (A)"), wherein a gaseous stream flows through and comes into contact with a catalyst material, and of void segments (B), wherein heat is radiated from the inside wall surface in the void segment (B) to a catalyst segment surface constituting an interface between the catalyst segment (A) and the void segment (B);

wherein a heat flux by radiation through the inside wall surface occurs in the one or more segments (A) in the range of 15 to 100 kW/m$^2$;

wherein a catalyst segment (A) has one void segment (B) on either side of it, and wherein a void segment (B) contains a supporting member; said reaction chamber being made of a material(s) that is (are) suitable to resist a temperature of 700° C. or more; and a heating means for heating the reaction chamber such that an outside wall surface of the reaction chamber is at a higher temperature than the inside wall surface of the reaction chamber.

In a preferred embodiment, the area of the inside wall surface of a void segment (B) (herein to be referred as "void segment surface") is at least equal or greater than the catalyst segment surface of one of its neighboring catalyst segments (A).

In the reactor of the present invention, the reaction chamber contains in general a catalytically active material which is retained within a plurality of catalyst segments (A) (which may be referred to also as "catalyst beds") within the reaction chamber such that reactant(s) flow through the catalytic beds and come into contact with the catalytically active material when the reactant flows from the entrance port in the direction of the exit port. The reaction chamber comprises a plurality of catalyst segments (A) which are in general supported by a suitable supporting member that allows that the catalyst segments (A) are kept in place at a specified distance from each other. Moreover, the reaction chamber comprises a plurality of void segments (B) such that in general one void segment (B) borders two catalyst segments (A). Accordingly, the catalyst segment surfaces of two catalyst segments (A) facing each other are in general accessible to radiation from the inner wall surface in the void segment (B) between the two catalyst segments (A).

The shape of the reaction chamber will depend on the chemical process to be carried out therein and in particular on required heat transfer characteristics as well as flow properties relating to the reactants and products involved in the chemical process.

In a preferred embodiment of the reactor, the reaction chamber has the shape of a tube with the entrance port at a first end and the exit port at a second end.

The term "catalyst segment (A)" as used herein generally refers to a segment that comprises a catalyst. In general, a catalyst is provided on a suitable support. The catalyst, i.e. a catalytically active material, is not limited as long as it can be used in the reactor of the present invention. In general, a suitable catalytically active material comprises a support material on whose surface a heterogeneous catalyst is placed. The support material is in general an inactive material with respect to the chemical reaction carried out in the reactor.

A catalyst segment (A) might be comprised of a compact material, for example a porous three-dimensional body. Examples of porous three-dimensional bodies as understood herein are in particular meshes or foams. As an alternative material or in addition thereto, a catalyst segment (A) might comprise individual pellets which in turn might comprise a porous material. Preferably, the porous material is catalytically active.

In a preferred embodiment of the reactor, the catalyst segments (A) contain or consist of one selected from the group consisting of pellets, extrudates, spheres, monoliths, and other combinations of structured and non-structured catalyst supports which contain catalyst.

In another preferred embodiment of the reactor, the catalyst segments (A) contain or consist of a porous metal foam structure which supports a catalyst or itself acts as a catalyst.

The shape of the catalyst segments (A) is not particularly limited as long as it may be used in the reactor of the present invention, and in particular its reaction chamber. It will depend on the type of the catalyst material used, the shape of the reactor chamber as well as on the type of chemical process which is to be carried out in the reactor.

In a preferred embodiment of the reactor, the catalyst segments (A) have the shape of a flat disc or a cone. It is to be noted here that not all catalyst segments (A) in the reaction chamber must have the same shape.

The term "void segment (B)" as used herein generally refers to a segment that comprises or consists of a void, wherein the void borders the inside wall surface of the reaction chamber and is thus at least partially accessible to radiation from the inside wall surface of the reaction chamber in the void segments (B). The term "void" as used herein does thus not refer to voids in the interior of a segment that do not border the inner wall surface of the reaction chamber, so-called inner voids that might also exist in the reactor of the present invention though they are usually to be avoided. The shape of the void is not particularly limited as long as it allows that radiation from an inner wall surface of the reaction chamber can access the void segment (B) and a portion of catalyst segment (A).

The interface between segment (A) and segment (B) which is in general the surface of catalytically active material adjacent to segment (B) can have various shapes as long as an efficient heat transfer from the inner surface of the reaction chamber wall is assured. It may be for example flat or curved. Moreover, slots or elevated areas like bumps might be provided, or it could have a simple coned shape.

The catalyst segment(s) (A) may even be inclined at an angle (i.e. not necessary at 90° to the direction of the gas flow; e.g. it could be at 30°, or 45°) relative to the central axis of the reactor.

The interface between segment (A) and segment (B) extends in general into the interior of the reaction chamber. The selection of a suitable interface will be usually effected considering the type and shape of the reaction chamber to be used and the nature of the chemical reactions to be performed therein.

The shape of the void will depend on the shape of the reaction chamber. The void may thus have for example the shape of a disc which vertically intersects a longitudinal axis in a tubular reactor. In this case, void segment (B) is actually a void space. Other examples for shapes of voids are straight or curved channels or other types of cavities. The void space (void segment (B)) has in general a shape that is adapted to allow adequate access of a catalytically active material to radiation from the inner wall surface of the reaction chamber.

The void segment(s) (B) contain a supporting member which acts in general as a mechanical support for the catalyst segment(s) (A) ("catalyst bed" (A)) above it providing the necessary separation distance between neighboring catalyst beds. The supporting member, in particular a vertical supporting member in a tube reactor, may not only hold the foam segments, but may also provide extra radiation surface.

The void segment(s) (B) can contain a material in the shape of a spinning top aligned on the central axis of the segment (A), which absorbs radiation and also reflects radiation to the surfaces of catalyst segments (A) which are in proximity to that void. Or it could consist of finned plates for example, three plates at 120° apart, which in this case could support and maintain the void gap between neighboring catalyst segments (A), and also act as a heat transfer surface to which the inside high temperature wall of the voids would radiate heat.

The term "void" as used herein thus means in general a void space next to an inner wall of the reaction chamber. Preferably, the void is shaped such that a surface of a solid material adjacent to the void, or within the void is accessible to an adequate amount of radiation from the inner wall of the void (which is at the higher temperature), by a combination of direct and reflective radiation exchanges, to an extent of at least 30%, preferably at least 40% and more preferably at least 70%.

In addition to segments (A) and (B), the reactor of the present invention may also comprise other types of segments, perhaps containing or consisting of some other inert material that may be used in between segments (A) and (B), and that might be different from the material of the supporting member.

The thickness of the segments (A) as well as the thickness of the segments (B) can vary and will be properly selected in accordance with a chemical process to be performed in the reactor.

The thickness of the catalyst segment (A) depends in general on the chemical reaction to be carried out and its consequential energy requirements at local conditions of temperature and the concentrations of reactants and products, and how that energy will be provided to sustain the necessary level of reaction in that catalyst segment (B). For example, if the rate of reaction is very fast and because of the endothermic nature of the reaction a large amount of energy needs to be transferred to the gas, then the thickness will be less than if the rate of reaction was a lot slower.

Moreover, the thickness of the catalyst segment (A) depends on the position of the respective catalytically active material containing segment (A), for example in a tube, and radiation view factors into that structure. The thickness of the segment (A) thus also depends on the penetration of radiation energy into segment (A). For example, for a metal foam this depends on the pore size of the foam. In large pores, the view factor would be more favourable enabling radiation to penetrate deeper into the structure. The same considerations apply accordingly to other types of catalytically active materials, e.g. in monoliths (channel diameter) and in pellets (pellet diameter, shape, holes in pellet, void fraction).

As an example, the thickness of catalyst segment (A) may be in a range of from 10 mm to 100 mm.

It may be advantageous to have a minimal distance between the catalyst segments (A). For example, if void segments (B) consist essentially only of void and if the reactor is a tube reactor with an inner radius R, the distance W between the catalyst segments (A) is preferably in the range of from 0.2 R to 3 R, depending also on the shape of the surface of catalyst segments (A) and how much they protrude into the void space in void segment (B).

In the reactor of the present invention, the intention is for the reactants to flow through the catalytic beds and thereby come into contact with the catalytically active material as the reactant(s) and product(s) flow from the inlet in the direction of the outlet. However, this does not preclude the existence of a small gap between the inner wall surface and the catalyst segment (A). This gap, if present, would usually be small allowing a small portion of the gas to by-pass the catalyst segment (A), preferably 1 to 7% by volume, the size of the gap would depend on the cross-sectional flow area of the reactor, however, if a tube with an 80 mm internal diameter was used, then the gap could be in the region of 1 to 4 mm. This gap may not be continuous, as it could contains obstructions such that reactants which might flow in the gap are forced to flow back and forth between the catalytically active material and the gap, and/or such an obstruction may be designed to promote convective heat transfer in proximity to the wall.

According to a preferred embodiment of the reactor, there is thus a small gap between the inside wall of the reaction chamber and the catalyst segment (A), whereby the gap allows 1 to 7% by volume of the gas to by-pass the catalyst segment (A)(5).

In the reactor of the present invention in general a chemical reaction is carried out that is catalyzed by the catalyst material. Hence, a sufficient contact between the reactants and the active catalytic material in the catalyst segment (A) is necessary and methods of achieving this are well known in the literature.

In a preferred embodiment, the surface composition and/or structure of the catalytically active material is different from the composition and/or structure in a core. For example the surface of the catalytically active material might be modified in order to better allow absorption of radiant energy from the inner wall surface. Accordingly, the catalytic properties at the surface might be different than in the core.

Preferably, the porous body contains or consists of a foam. In addition, the foam may be a ceramic or metallic foam. In a preferred embodiment, a metallic foam is used. The metallic foam contains preferably at least one metal selected from the group consisting of Ni, Fe, Co, Cu, Ag, Au, Pt and Pd, or an alloy containing one or more of these metals. Even more preferably, the metallic foam contains at least one metal selected from among Ni, Co, Cu, and Ag. The metallic foam may also contain leachable metals like for example Al, Si or Zn.

When a metallic foam is used, it can function as heterogeneous catalyst substrate or catalyst. Preferably, the surface of the metal foam is modified in order to depict specific catalytic properties. One way of modifying the surface of the metal foam is by alloying a base metal foam with one or more suitable different metal which might be selected among the aforementioned metals. Moreover, promoters, i.e. promoter elements that improve the desired characteristics of a metallic foam may be used, in particular in the surface portion. Promoters may be for example chromium, manganese, iron, vanadium, tantalum, titanium, tungsten, molybdenum, rhenium and or/metals of the platinum group, germanium, tin, antimony or bismuth. The amount of promoter in the metallic foam can vary largely as it depends on the type of promoter and its intended use, but is in general in the range of up to 10 wt.-%, based on the total weight of the foam. For example, if Cr or Mo is used a promoter, their amount is often in the range of from 2 to 3 wt.-%.

Metallic foams are known as such. A metallic foam which may be used in the reactor of the present invention is not particular limited. Thus, closed cell and open cell metallic foams as well as foams containing both closed and open cells can be used. Preferably, open cell metallic foams are used. The morphological characteristics including pore size and shape, strut thickness, area density, foam density, geometric surface area and porosity can vary broadly. Moreover, these metallic foams can be obtained by a variety of methods. For example, an organic polymer foam made from a foamable polymer can be coated with a metallic material where after the organic polymer foam is removed, for example by burning it off at an elevated temperature or by removing it with a suitable solvent. The coating can be achieved by bringing the organic polymer foam in contact with a melt, solution or suspension that contains the metallic material. This can be for example conveniently carried out by spraying the organic polymer foam with or by dipping it in a corresponding solution or suspension containing the first metallic material. Alternatively a dry deposition could be carried out by for example chemical vapor deposition of the metallic material.

In a preferred embodiment of the present invention, the metallic foam is obtainable by coating a polyurethane (PU) foam with the metallic material containing the desired metal or metals and then burning off the polyurethane (PU) foam. Coating is preferably effected by an electrolytic deposition of the metallic material on the polyurethane (PU) foam. To this end, the surface of the polyurethane foam is rendered conductive by a known measure before the electrolytic deposition is being carried out.

The use of metal foams is preferred in the reactor of the present invention since metal foams show a good structural homogeneity, high porosity, light weight, large surface area, and formability. Moreover, as regards, flow, mass and heat transfer characteristics, metal foams allow a low pressure drop, an enhanced flow mixing, high heat transfer and mass transfer rates, high thermal conductivity and a low diffusion resistance due to a thin catalyst layer. In comparison to ceramic pellets it is to be noted that a higher mechanical and thermal strength can be achieved. Finally, in specific embodiments a metal foam may show an excellent oxidation and corrosion resistance.

In a further preferred embodiment, the catalyst segment (A) contains pellets which are retained by suitable means, in particular a tray. These pellets may be compact particles or porous particles. In both cases, the particles are preferably coated with a catalyst, i.e. a heterogeneous catalyst.

The reaction chamber may have different shapes and sizes. The selection of the shape and size will depend in general on the chemical reaction to be performed in the reactor. In particular, the shape and size will depend on the heat transfer involved in the chemical reaction.

In order to have a sufficient throughput, a multi-tube configuration is usually used to provide a large heat transfer surface area, and these tubes are positioned inside a fuel fired furnace that has multiple burners positioned inside the furnace which provide the necessary heat to support the endothermic reactions taking place inside the tubes.

In an embodiment, assuming that the tubes (reactors) are mounted in a vertical orientation, in each tube, horizontally spaced metal foam disks in the shape of a cone would contain the catalytically active material, thereby forming the catalytic beds known as segments (B) in the tube reactor.

In this case the interface would thus be in the form of a cone, which protrudes into the void segment (A). The shape of the cone, providing a suitable surface for the exchange of heat transfer by radiation between the inside wall of the void in segment (A) and its neighbouring catalytic beds. The cones could be supported and separated from one another by three metal fins mounted at 120° around the perimeter of the cone, which would also provide an additional surface area for the exchange of radiation from the side walls of the void to these fins, which in turn would transfer the heat by convection to the gas flowing past them.

Such metallic foam is likely to contain preferably at least one metal selected from the group consisting of Ni, Fe, Co, Cu, Ag, Au, Pt and Pd, or an alloy containing one or more of these metals.

When metallic foam is used, it could either function as heterogeneous catalyst substrate to which a catalytic active material is attached (either on its own or in combination with a high surface area additional support), or as a catalyst on its own. However, it must also have a significant percentage of open cells (e.g. porosity in the range of 0.5 to 0.99), to allow the gases to flow through this catalytic bed. However, the morphological characteristics including pore size and shape, strut thickness, area density, foam density, geometric surface area and porosity can vary broadly depending on the application.

In case of a tube reactor, i.e. a reactor with one or more tubes as reaction chambers, the tubes may have in general an inner diameter of from 10 mm to 200 mm, more preferably of from 75 to 120 mm and even more preferably from 90 to 110 mm.

Preferably, the number of catalyst segments (A) is at least 4, more preferably at least 6, and even more preferably at least 10 and the number of void segments (B) is preferably at least 4, more preferably at least 6, and even more preferably at least 10.

The number of segments will often be larger and will be properly selected depending on the chemical process which is to be performed in the tube reactor. For example, for a SMR (steam methane reforming) tube reactor, the overall number of segments (A) and (B) might be preferably 80 to 200, more preferably 100 to 180, over a length of 10 m of tube in an SMR tube reactor.

Thus, in the reactor of the present invention it is even more preferred that the number of catalyst segments (A) as well as the number of void segments (B) is at least 100.

In general, the temperature of the wall of the reactor, for example tube wall, could be in the range of from 600 to 1200° C., depending very much on the heat flux and the overall heat transfer coefficients inside the tube. The pressure inside the tube could be in the region of 1 to 70 bar(g), and of course, the material of the wall should be properly selected to be suitable for an operation at the conditions of temperature and pressure selected for the application.

Tubes that may be used in accordance with the present invention have in general an inner diameter of from 10 mm to 200 mm, more preferably of from 75 to 120 mm and even more preferably from 90 to 110 mm.

In this embodiment, it is moreover preferred that the segment (A) and the segment (B) are discs provided vertical to an axis essentially going through the inlet and the outlet. An example thereof are foam disks spaced in the direction of a tube fixed bed reactor.

It is moreover preferred that a void segment (B) is present at both the entrance port and the exit port of the tube reactor. Thus, a suitable sequence of segments might be: segment (B), segment (A), segment (B), segment (A), segment (B).

The segments can be suitably fixed within the reaction chamber. In the case, where the catalytically active material consists of pellets it might be useful to provide these pellets on trays which are suitably fixed within the reaction chamber. The location and spacing of the trays will then be adapted to the amount of pellets used or vice versa, such that the catalyst segments (A) contain pellets in a thickness which is sufficient to bring them in contact with the reactants of a chemical process to be catalyzed by them.

Preferably, in the reactor of the present invention, the void segment (B) has a shape such that at least 10% of a surface of an adjacent catalytically active material is accessible by direct radiation from the inner wall of the reaction chamber.

Moreover, a void fraction in a void segment (B) is preferably 20 to 90%, based on the total volume of the void segment (B). Herein the void fraction indicates the percentage of the volume of a void segment (B) that is void space.

The invention is moreover directed to a process of carrying out a chemical reaction in a radiating wall catalytic reactor for providing heat from the inside wall of a reaction chamber by radiation to support an overall endothermic reaction taking place in the reaction chamber, comprising a reaction chamber with an entrance port for the introduction of a gaseous reactant(s) in a continuous manner into the reaction chamber and an exit port to enable the gaseous product(s) to leave the reaction chamber in a continuous manner;

wherein said reaction chamber comprises a plurality of catalyst segments (A), wherein a gaseous stream flows through and comes into contact with a catalyst material, and of void segments (B), wherein heat is radiated from the inside wall surface in the void segment (B) to a catalyst segment surface constituting an interface between the catalyst segment (A) and the void segment (B);

wherein a heat flux by radiation through the inside wall surface occurs in the one or more segments (A) in the range of 15 to 100 kW/m$^2$;

wherein a catalyst segment (A) has one void segment (B) on either side of it, and wherein a void segment (B) contains a supporting member; said reaction chamber being made of a material(s) that is (are) suitable to resist a temperature of 700° C. or more;

and a heating means for heating the reaction chamber such that an outside wall surface of the reaction chamber is at a higher temperature than the inside wall surface of the reaction chamber;

wherein reactants are introduced via the entrance port, flowed through the reaction chamber and brought into contact with the catalyst material, i.e. a catalytically active material, while the catalyst segment surface of the catalyst segments (A) is heated by radiation from the inside wall surface to carry out an overall endothermic reaction.

The present invention is especially important for overall endothermic reactions occurring inside the chemical reactor. This does not preclude that some of the individual reaction steps could be exothermic, as long as the overall reaction sequence is an endothermic one, in which heat has to be supplied. Thus in an example of the process of the invention at least one individual exothermic reaction takes place within the overall endothermic reaction.

It is moreover to be noted that as a chemical reaction might approach equilibrium conditions, the amount of heat required to sustain the reaction is less. In an endothermic reaction the outer walls of the reactor are usually heated to a sufficiently high temperature, so that the wall of the reactor is at a higher temperature then the gas flowing through it. This provides the driving force for heat transfer from the reactor wall into the fluid flowing inside the reactor. The heating of the reactor wall, is in general effected by the transfer of heat by a combination of radiation and convection from a flame and the hot gaseous zone(s) created by a fuel-fired burner(s).

The reactants to be used in a chemical reactor of the present invention are preferable in a gas phase. Moreover, the pressure under which reactions are usually carried out in the reactor of the present invention is in general in a range of from 1 to 70 bar(g), and the temperature of the surface of the walls of the void segments (B) are likely to be greater than 700° C., above which heat transfer by radiation becomes more significant.

In the process of the present invention, the temperature of the outside wall surface of the reaction chamber, for example a tube wall, is in general in the range of from 600 to 1200° C. Moreover, in a preferred process the outside wall surface of the reaction chamber is heated to a temperature in the range of from 800 to 1200° C.

The reactants to be used in a chemical reactor of the present invention are in a gas phase. Moreover, the pressure under which reactions are usually carried out in the reactor of the present invention is in general in a range of from 1 to 70 barg.

The process according to the present invention is not limited. Preferably, the process is however a process which involves a large heat flux, as is the case in highly endothermic reactions. In particular, the process involves a large heat flux by radiation in one or more segments (A). The amount of heat flux depends on the chemical reaction and the shape of the reactor. Moreover, even if a tube reactor is used, the heat flux will depend on the diameter of the tube and may vary considerably along the length of the tube.

The process of the invention involves a heat flux by radiation in the one or more segments (A) of a tube reactor of 15 to 100 kW/m$^2$ through the inside wall surface of the reaction chamber, whereby the value within this range would depend on the specific application.

The reactor of the present invention is thus usually placed in a furnace containing burners and, for example, tubes. In the case of the SMR process, the tubes are packed in the segments (B) for example either with a nickel catalyst on a porous alumina support or with a suitable nickel foam. Other catalysts may as well be used in an SMR process, for example rhodium, cobalt, ruthenium or platinum.

The reactor of the present invention may be advantageously used for conducting many catalyzed chemical reactions which involve in particular organic compounds, for example hydrogenation, isomerization, hydration, hydrogenolysis, reductive amination, reductive alkylation, dehydration, oxidation, dehydrogenation, rearrangement and other reactions.

In a very preferred embodiment, the process is a steam methane reforming process (SMR) process. The SMR process involves steam reforming of natural gas to provide hydrogen and synthesis gas which is needed in many chemical and petrochemical processes. The SMR process involves the step of reacting a mixture containing methane and water as reactants to obtain a mixture containing carbon monoxide, carbon dioxide, hydrogen, unconverted reactants, and inert gases.

The reactor of the present invention is thus especially useful for use in a steam methane reforming process (SMR process).

The invention has numerous advantages. The reactor allows to perform chemical reactions with an improved heat exchange between a reaction chamber and an outside heating medium. This is of particular advantage in processes involving highly endothermic chemical reactions. Moreover, in embodiments of the process a more uniform temperature distribution within the reaction chamber can be obtained. In a retrofit application, overall, a higher rate of heat flux across the tube wall could be achieved—so throughput (i.e. amount of reactants fed into the reactor) on the plant could be increased; or throughput could be maintained the same, and tube life could be extended (by operating at lower tube metal surface temperatures). In a new design, a similar rate of heat transfer could be achieved, but either smaller diameter tubes could be used, or tubes with a shorter length could be used. All of these features lead to significant savings.

In the following the invention will be described in more detail by referring to FIGS. 1 to 5.

Figure 1:
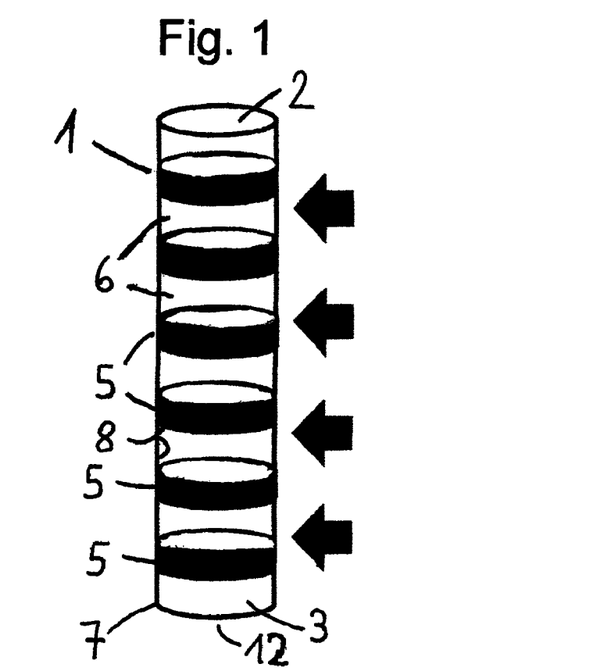

FIG. 1 shows the reaction chamber 1 of a reactor according to an embodiment of the present invention. 2 indicates a gas inlet port to the reactor and 3 a gas outlet port from the reactor. 5 indicates catalytically active segments (A) (to be referred to herein also as "catalytic beds") with a catalyst material, i.e. a catalytically active material, 4 which is here present in a continuous manner), and 6 void containing segments (B). The reaction chamber 1 has in this embodiment the shape of a tube 12. 7 indicates the wall of the reaction chamber 1 and 8 the inside wall surface of the reaction chamber 1.

Figure 2:
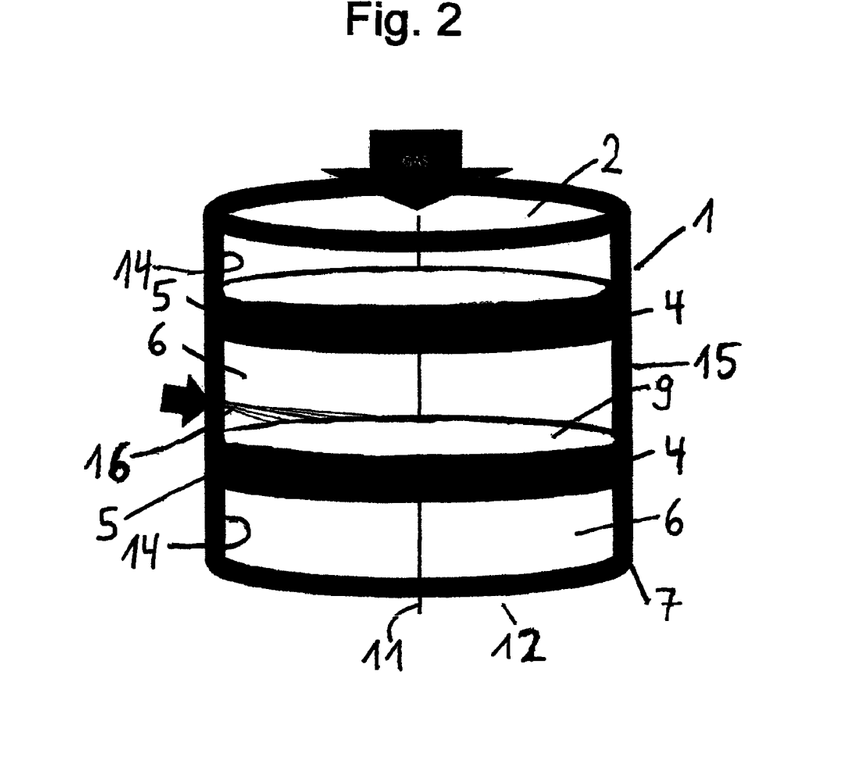

FIG. 2 shows an enlarged partial view on the reaction chamber 1 of FIG. 1. Thus, the reaction chamber has in this embodiment the shape of a tube 12. The thick arrow indicates the flow direction of reactants for a chemical process to be conducted in the reaction chamber. 4 indicates the catalytically active material which is here present in a continuous manner, 5 catalyst segments (A) and 6 void segments (B). The catalyst segment surface 9 indicates the interface between segments (A) and (B) and often the surface of the catalytically active material in segment (A). For simplicity, segments (A) and (B) have here the form of discs. Accordingly, the catalyst segment surface 9 constitutes a circle. 11 is an axis of the reaction chamber 1. 7 indicates the wall of the cylindric reaction chamber 1 and 8 the inside wall surface of the reaction chamber 1. The small thick arrow indicates a point on the inside wall surface 8 from which radiation 16 in the direction of catalyst segment surface 9 occurs. The points of incidence of the radiation 16 are indicated by long thin arrows.

Figure 3:
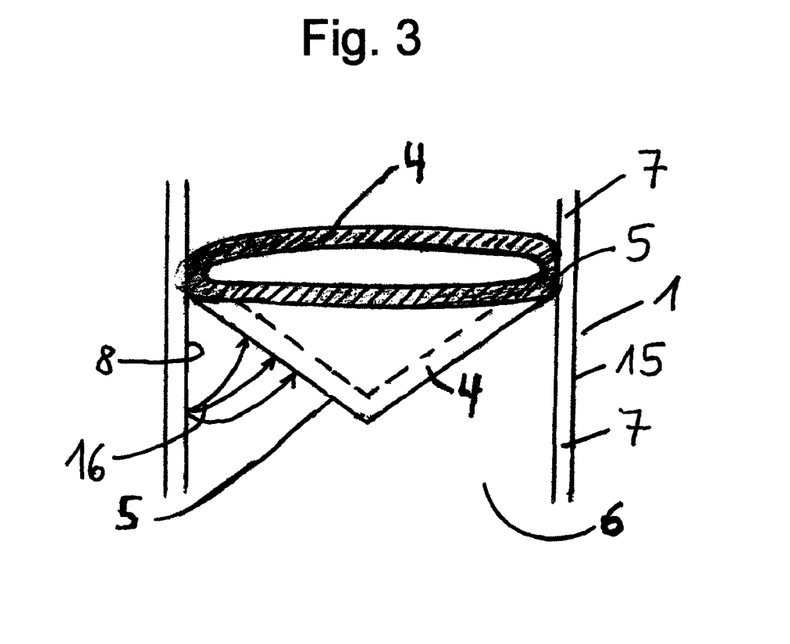

FIG. 3 shows an enlarged partial view of the reaction chamber of FIG. 1, except that catalyst segment (A) 5 now has a cone shape in which a catalyst material 4 is placed.

Only a single catalyst segment (A) is shown in this schematic, although similar shaped catalyst segments (catalytic beds) (A) would be stacked above and below, in general with an appropriately designed supporting member for stabilization of the catalytic beds which is also functioning as a spacer to create the necessary voids. Other shapes for the catalytic bed 5 could also be used. 16 indicates the radiation from the inside wall surface 8 of wall 7 of the reaction chamber 1. 15 indicates the outside wall of the reaction chamber 1.

Figure 4:
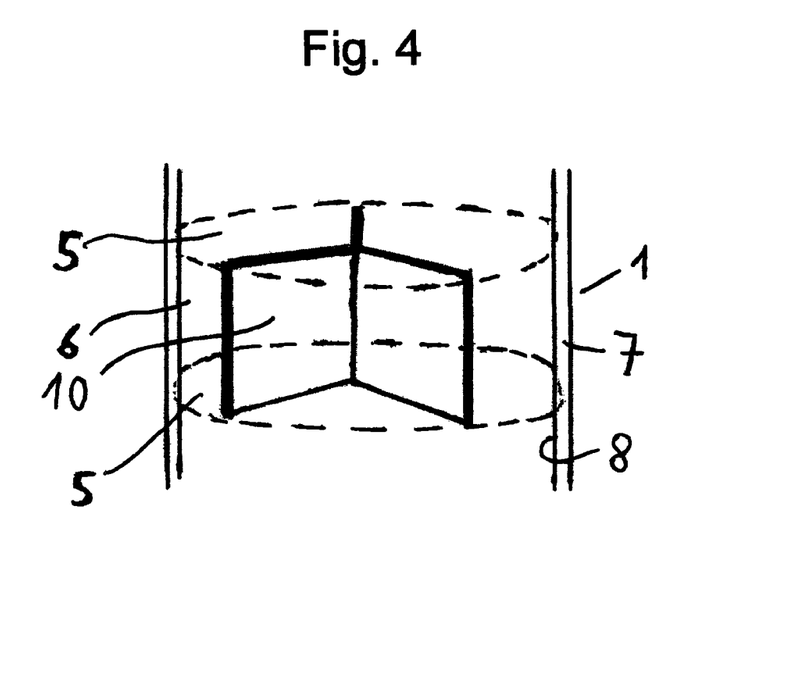

FIG. 4 shows an enlarged partial side view of the reaction chamber 1 of FIG. 1, except that it now illustrates by means of an example what is meant by the use of a supporting member 10 which here acts as: a mechanical support for the catalytic bed 5 as catalyst segment (A) above it, a spacer to create the void between neighbouring catalytic beds 5 (indicated by dashed oval shaped lines); and also as an additional surface for heat transfer by radiation from the inside wall 8 of the reaction chamber 1. The shape indicated in this particular embodiment is a three sided plate fin, but other shapes could also be used.

Figure 5:
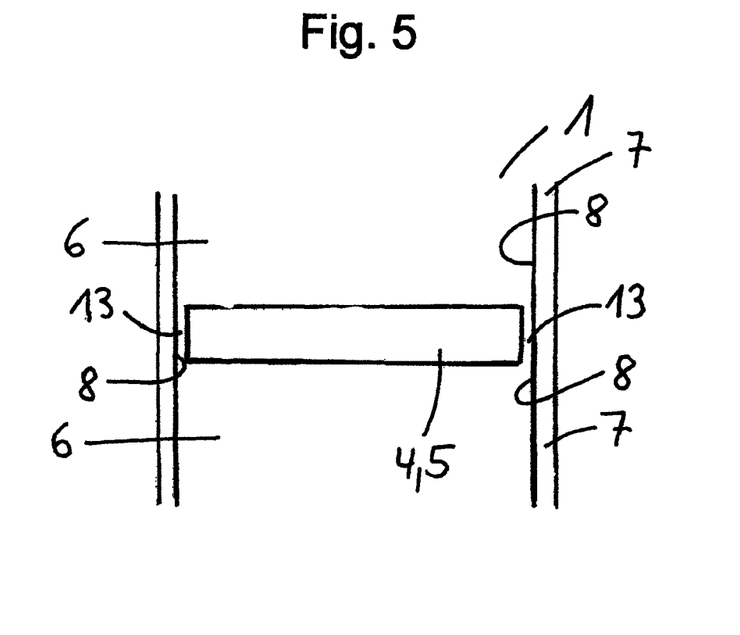

FIG. 5 shows an enlarged partial side view of the reaction chamber 1 of FIG. 1, except that it now shows the presence of a gap 13 near the wall 7 between the catalytic bed 5 containing a catalyst material 4 and the inside wall surface 8 of the reaction chamber 1. This enables a portion of the gas to by-pass the catalytic bed 5 and to enhance convective heat transfer at the wall 7 in proximity to the position of the catalytic bed 5.

LIST OF REFERENCE NUMERALS

1 reaction chamber
2 inlet port (for gaseous reactants)
3 outlet port (for gaseous products)
4 catalyst material; catalytically active material
5 catalyst segment (A)
6 void segment (B)
7 wall of reaction chamber
8 inside wall surface of reaction chamber
9 catalyst segment surface; interface between segment (A) and segment (B); for example surface of catalytically active material adjacent to segment (B)
10 supporting member
11 axis
12 tube
13 gap
14 void segment surface; (radiating) inside wall surface of reaction chamber in void segment (B)
15 outside wall surface of the reaction chamber
16 radiation

The invention claimed is:

1. A radiating wall catalytic reactor for providing heat from the inside wall surface (8) of a reaction chamber (1) by radiation (16) to support an overall endothermic gas phase chemical reaction taking place in the reaction chamber (1), comprising a reaction chamber (1) with an entrance port (2) for the introduction of a gaseous reactants in a continuous manner into the reaction chamber (1) and an exit port (3) to enable a gaseous product to leave the reaction chamber (1) in a continuous manner, said reaction chamber (1) comprising a plurality of catalyst segments (A)(5) containing a catalyst material (4), and a plurality of void segments (B)(6), wherein an individual catalyst segment (A)(5) and an individual void segment (B)(6) are alternatively positioned; wherein the reaction chamber is adapted such that a gaseous stream flows through and comes into contact with the catalyst material (4); and wherein heat is radiated from the inside wall surface (8) in the void segments (B)(6) to a catalyst segment surface (9) constituting an interface between the catalyst segments (A)(5) and the void segments (B)(6); and
a heating means for heating the reaction chamber (1) such that an outside wall surface (15) of the reaction chamber (1) is at a higher temperature than the inside wall surface (8) of the reaction chamber (1),
wherein the reaction chamber is adapted such that a heat flux by radiation through the inside wall surface (8) occurs in one or more of the catalyst segments (A)(5) in the range of 15 to 100 kW/m$^2$;
wherein the plurality of the catalyst segments (A)(5) comprise a first catalyst segment (A)(5)(*i*) and a neighboring second catalyst segment (A)(5)(*ii*), and the gaseous reactant flows through the first catalyst segment (A)(5)(*i*), the void segment (B)(6), and the neighboring second catalyst segment A(5)(*ii*); and
wherein one of more of the void segments (B)(6) contain a supporting member (10);
said reaction chamber (1) being made of a material that is suitable to resist a temperature of 700° C. or more; and
wherein the catalyst segments (A)(5) contain or consist of a porous metal foam structure which supports a catalyst or itself acts as a catalyst.

2. The reactor according to claim 1, wherein the area of the inside wall surface (8) of the void segments (B)(6) is at least equal or greater than the area of the catalyst segment surface (9) of one of its neighboring catalyst segments (A)(5).

3. The reactor according to claim 1, wherein the number of catalyst segments (A)(5) is at least 4 and the number of the void segments (B)(6) is at least 5.

4. The reactor according to claim 1, wherein the reaction chamber (2) has the shape of a tube (17) with the entrance port (2) at a first end and the exit port (3) at a second end.

5. The reactor according to claim 1, wherein there is a gap (13) between the inside wall surface (8) of the reaction chamber (1) and the catalyst segment (A)(5), whereby the gap (13) allows 1 to 7% by volume of the gas to by-pass the catalyst segment (A)(5).

6. The reactor according to claim 1, wherein the catalyst segment (A) has the shape of a flat disc or a cone.

7. The reactor according to claim 1, wherein the catalyst segments (A)(5) contain or consist of one selected from the group consisting of pellets, extrudates, spheres, monoliths, and combinations of structured and non-structured catalyst supports which contain a catalyst.

8. The reactor according to claim 1, wherein the void segment (B)(6) has a shape such that at least 10% of the catalyst segment surface (9) of an adjacent catalyst segment (A)(5) is accessible by direct radiation from the void segment surface (14) of the reaction chamber (1).

9. A process of carrying out a chemical reaction in a radiating wall catalytic reactor for providing heat from the inside wall surface (14) of a reaction chamber (1) by radiation (16) to support an overall endothermic reaction taking place in the reaction chamber (1), said reaction chamber (1) being provided with an entrance port (2) for the introduction of a gaseous reactant in a continuous manner into the reaction chamber (1) and an exit port (3) to enable a gaseous product to leave the reaction chamber (1) in a continuous manner;
wherein said reaction chamber (1) comprises a plurality of catalyst segments (A)(5), wherein the reaction chamber is adapted such that a gaseous stream flows through and comes into contact with a catalyst material (4), and of void segments (B)(6), wherein heat is radiated from the inside wall surface (8) in the void segments (B)(6) to a catalyst segment surface (9) constituting an interface between the catalyst segment (A)(5) and the void segment (B)(6); and a heating means for heating the reaction chamber (1) such that an outside wall surface (15) of the reaction chamber (1) is at a higher temperature than the inside wall surface (8) of the reaction chamber (1);

wherein the reaction chamber is adapted such that a heat flux by radiation through the inside wall surface (8) occurs in one or more of the catalyst segments (A)(5) in the range of 15 to 100 kW/m$^2$;

wherein the plurality of the catalyst segments (A)(5) comprise a first catalyst segment (A)(5)(*i*) and a neighboring second catalyst segment (A)(5)(*ii*), and the gaseous reactant flows through the first catalyst segment (A)(5)(*i*), the void segment (B)(6), and the neighboring second catalyst segment A(5)(*ii*), and wherein one of more of the void segments (B)(6) contain a supporting member (10);

said reaction chamber (1) being made of a material that is suitable to resist a temperature of 700° C. or more;

and wherein the catalyst segments (A)(5) contain or consist of a porous metal foam structure which supports a catalyst or itself acts as a catalyst, wherein the reactant is introduced via the entrance port (2), flowed through the reaction chamber (1) and brought into contact with the catalyst material (4) while the catalyst segment surface (9) of the catalyst segments (A)(5) is heated by radiation (16) from the inside wall surface (8) of the reaction chamber (1) to carry out an overall endothermic reaction.

10. The process according to claim 9, wherein at least one individual exothermic reaction takes place within the overall endothermic reaction.

11. The process according to claim 9, wherein the outside wall surface (15) of the reaction chamber (1) is heated to a temperature in the range of from 800 to 1200° C.

12. The process according to claim 11, wherein the process is a steam methane reforming process.

* * * * *